United States Patent [19]
Block et al.

[11] 3,951,644
[45] Apr. 20, 1976

[54] METHOD OF PRODUCING IRON AND STEEL FROM IRON ORE

[75] Inventors: Robert J. Block; James H. Christensen, both of Norman, Okla.

[73] Assignee: HeaTran, Inc., Houston, Tex.

[22] Filed: May 6, 1974

[21] Appl. No.: 467,198

[52] U.S. Cl. .................................................. 75/42
[51] Int. Cl.² ............................................ C21B 5/06
[58] Field of Search ................ 75/38, 40, 41, 60, 42

[56] References Cited
UNITED STATES PATENTS 3,301,661  1/1967  McGlynn et al. ...................... 75/40

*Primary Examiner*—M. J. Andrews
*Attorney, Agent, or Firm*—C. Clark Dougherty, Jr.

[57] ABSTRACT

The present invention relates to an improved method of producing molten iron and steel from iron ore wherein the iron ore is charged to a shaft furnace along with coke and limestone and the mixture is blasted with a heated gas so that the iron ore is reduced to pig iron. By the present invention, at least a portion of the furnace residue gas stream containing carbon monoxide is oxidized so that a heated gas stream is produced and oxygen is combined therewith. The resulting heated oxygen enriched gas stream is recycled into the furnace as blast gas.

9 Claims, 3 Drawing Figures

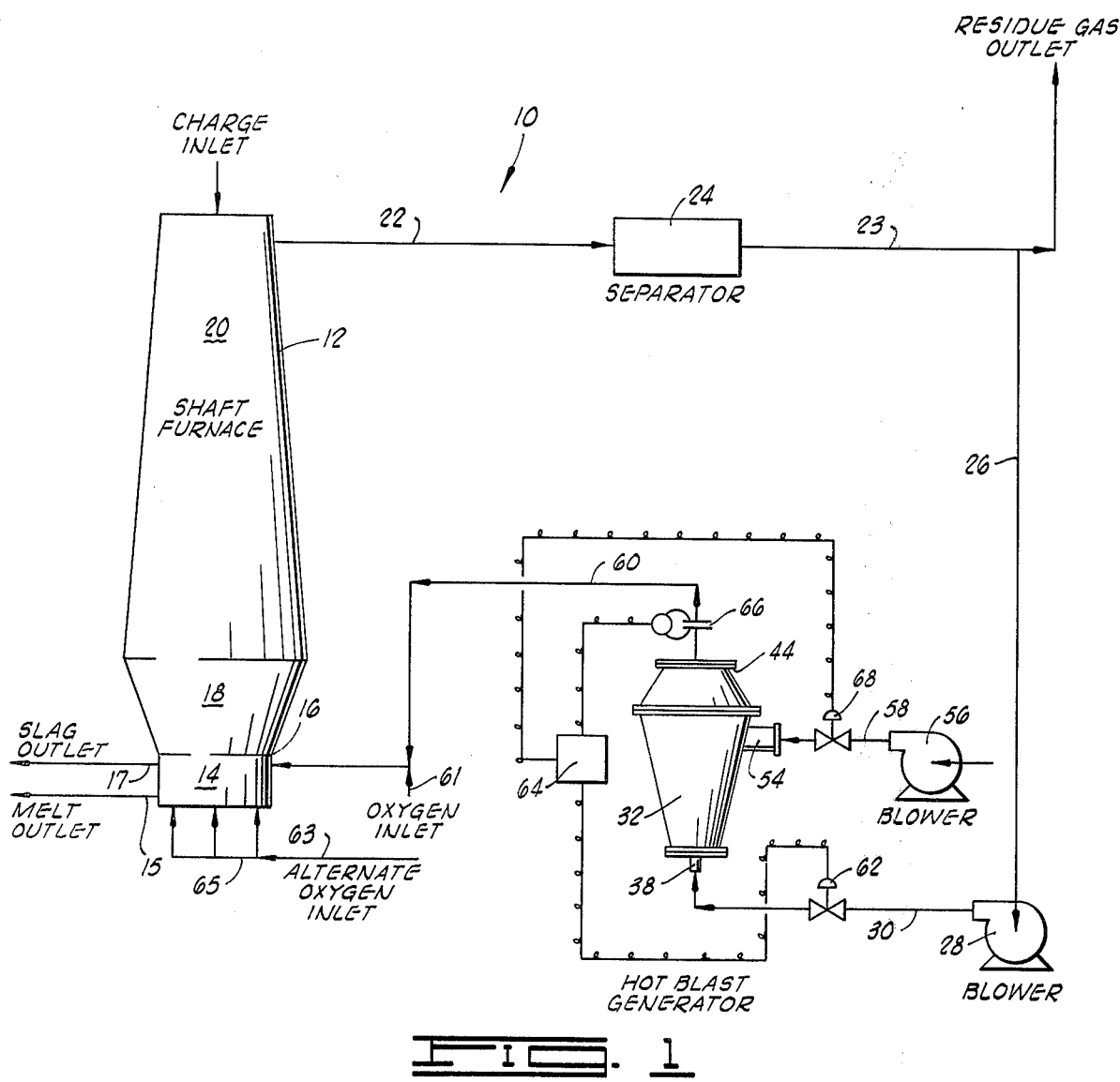
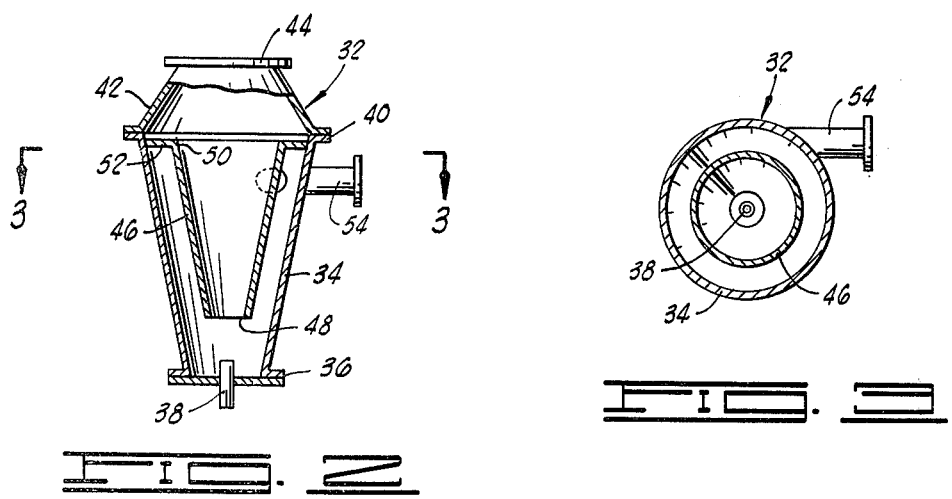

3,951,644

METHOD OF PRODUCING IRON AND STEEL FROM IRON ORE

BACKGROUND OF THE INVENTION

1. Field of the Invention

The present invention relates to methods of producing iron from iron ore, and more particularly, but not by way of limitation, to an improved method of producing iron and/or steel from iron ore wherein the iron ore is charged to a blast furnace along with coke and limestone and blasted with a heated reducing gas stream.

2. Description of the Prior Art

Blast furnaces have been utilized for many years in the steel industry for converting iron ore into molten pig iron. Generally, such blast furnaces are large shaft reactors wherein a continually descending column of iron ore, coke and limestone is blasted with a continuous stream of air preheated to a high temperature. In its descent through the shaft, the iron ore is reduced to molten iron by reaction with the ascending gas stream and by reaction with carbon in the furnace. Heretofore, the heated reducing gas stream has been generated by passing a stream of air through one or more regenerative stoves wherein the air is heated. Typically, the regenerative stoves are comprised of one or more large refractory lined towers and are operated by first heating the refractory by combustion of fuel and air therein and then forcing a stream of air through the tower so that it is heated. Such regenerative stoves or towers are generally expensive to install, difficult to operate and the refractory materials require expensive periodic maintenance.

By the present invention an improved method of producing iron and steel from iron ore is provided wherein regenerative stoves are not required and the preheated reducing gas stream is generated in relatively inexpensive easy-to-operate combustion apparatus.

SUMMARY OF THE INVENTION

The present invention relates to an improved method of producing molten iron from iron ore wherein the iron ore along with the coke and limestone are charged to a shaft furnace and contacted therein with a heated oxygen enriched gas stream. As a result, the iron ore is reduced to molten iron and a furnace residue gas stream containing carbon monoxide is produced. The residue gas stream is withdrawn from the shaft furnace and at least a portion thereof combined with a stream of air. The resulting residue gas-air mixture is combusted so that carbon monoxide contained therein is converted to carbon dioxide and a heated gas stream comprised of water vapor, nitrogen, oxygen and carbon dioxide is produced. A stream of oxygen is combined with the heated gas stream and the resulting heated oxygen enriched gas stream formed is introduced into said shaft furnace so that it contacts iron ore, coke and limestone therein.

It is, therefore, a general object of the present invention to provide an improved method of producing iron and steel from iron ore.

A further object of the present invention is the provision of a method for producing molten iron from iron ore in a blast furnace wherein regenerative stoves for generating heated blast gas are not required.

Yet a further object of the present invention is the provision of a process for producing metallic iron from iron ore wherein the iron ore is contacted with a heated reducing gas stream produced from recycled blast furnace residue gas.

Another object of the present invention is the provision of an improved process for producing molten pig iron and converting it to molten steel which can be carried out in relatively inexpensive to install and operate apparatus as compared to heretofore utilized apparatus.

Other and further objects, features and advantages of the invention will be readily apparent from a reading of the detailed description of preferred embodiments of the invention which follow when taken in conjunction with the accompanying drawing.

BRIEF DESCRIPTION OF THE DRAWING

FIG. 1 illustrates apparatus which can be utilized for carrying out the improved method of the present invention in diagrammatic form;

FIG. 2 is a side elevational view of a portion of the apparatus of FIG. 1 taken in cross section; and FIG. 3 is a sectional view taken along line 3—3 of FIG. 2.

DESCRIPTION OF PREFERRED EMBODIMENTS

In operation of a conventional blast furnace, iron ore, coke and limestone are continuously charged to the top of the furnace so that a continually descending column thereof is provided within the furnace. A stream of preheated blast gas, normally air heated to a temperature in the range of from about 900°F to about 2000°F in regenerative stoves, is introduced into the furnace at a point near the bottom thereof so that a reducing atmosphere is formed within the furnace. As a result of the reaction of the iron ore with carbon monoxide in the reducing gas and carbon in the shaft of the furnace, the iron ore is reduced to molten iron which accumulates in the hearth and is periodically withdrawn therefrom. The gangue material of the ore and the ash of the coke are fluxed by reaction with the limestone which is calcined in the shaft to form a fluid molten slag which accumulates as an immiscible layer on top of the molten iron and is periodically withdrawn therefrom. The furnace residue gas which exhausts from the top of the charge column contains carbon monoxide and hydrogen and has heretofore been utilized as fuel for heating the regenerative stoves and other boilers, open hearth furnaces, etc. in the area of the blast furnace.

By the present invention, the blast furnace residue gas stream or a portion of such gas stream is recycled and utilized for generating the heated blast gas required resulting in a more efficient process for producing molten iron as compared to heretofore utilized processes. The generation and heating of the blast gas in accordance with the present invention can be carried out in a simple economical apparatus as compared to the regenerative stoves heretofore used.

Broadly described, the method of the present invention for producing molten iron from iron ore comprises the steps of charging said iron ore along with coke and limestone to a shaft furnace, contacting the mixture with a heated oxygen enriched gas stream whereby the iron ore is reduced to molten iron and a furnace residue gas stream containing carbon monoxide is produced, withdrawing the residue gas stream from the shaft furnace, combining at least a portion of the residue gas stream with a stream of air, combusting the residue gas-air mixture so that a heated gas stream comprised of water vapor, nitrogen, oxygen and carbon dioxide is produced, combining a stream of oxygen with the heated gas stream and introducing the resulting oxygen enriched heated gas stream into the shaft furnace so that it forms additional reducing gas therein.

Referring to the drawing and particularly to FIG. 1, apparatus for carrying out the improved process of the present invention is illustrated diagrammatically and is generally designated by the numeral 10. The apparatus 10 includes a shaft furnace 12 which can be a conventional blast furnace of the type used heretofore for the conversion of iron ore into molten pig iron. The shaft furnace 12 includes a hearth section 14, a tuyere section 16, a bosh section 18 and a shaft section 20. As will be understood by those skilled in the art, iron ore, coke and limestone are continuously charged to the shaft furnace 12 in a conventional manner so that a descending column of iron ore, coke and limestone is formed in the shaft section 20 thereof. Residue gas produced in the shaft furnace 12 is withdrawn therefrom by way of a conduit 22 and caused to flow through a conventional separator or scrubber 24 which removes solid contaminants therefrom. The resulting clean residue gas flows by way of the conduit 23 to a point of further use or processing. A conduit 26 connects the conduit 23 to the suction of a conventional gas compressor or blower 28. The discharge of the blower 28 is connected by a conduit 30 to the fuel inlet connection 38 of a combustion chamber 32. The combustion chamber 32 may take a variety of forms and functions to bring about the oxidation and heating of the residue gas stream flowing therein by way of the conduit 30.

Referring now particularly to FIGS. 2 and 3, the combustion chamber 32 preferably includes an outer shell 34 formed in the shape of an inverted truncated cone, the lower end of which is closed by a flange assembly 36. The fuel gas inlet connection 38 of the chamber 32 is positioned through the flange assembly 36 concentrically with respect to the axis of the outer shell 34. As will be understood by those skilled in the art, ignition and flame detection means (not shown) utilized with the combustion chamber 32 are normally attached through the flange assembly 36. The upper end of the outer shell 34 terminates in a flange assembly 40 which is connected to a duct 42. The duct 42 includes a flanged outlet connection 44 at its upper end.

An inner shell 46 is disposed concentrically within the outer shell 34. The inner shell 46 is formed in the shape of an inverted truncated cone, the lower end 48 of which is open and terminates short of the flange connection 36 attached to the outer shell 34. The upper end 50 of the inner shell 46 is sealingly attached to an annular baffle 52 which is in turn sealingly attached to the outer shell 34.

A tangential air inlet connection 54 is provided connected through the outer shell 34 at its upper end. As will be understood, the air inlet connection 54 opens tangentially into the annular closed area defined by the inner shell 46, the baffle 52 and the outer shell 34 of the combustion chamber 32.

Referring again to FIG. 1, a conventional air compressor or blower 56 is provided, the discharge of which is connected by a conduit 58 to the air inlet connection 54 of the combustion chamber 32. The outlet connection 44 of the combustion chamber 32 is connected to a conduit 60 which is in turn connected to inlet nozzles distributed about the tuyere section 16 of the shaft furnace 12.

A flow control valve 62 is disposed in the conduit 30 and a flow control valve 68 is disposed in the conduit 58. A conventional flow ratio controller 64 is provided operably connected to the control valves 62 and 68. A conventional flow rate sensing device 66 is disposed in the conduit 60 operably connected to the flow ratio controller 64. As will be understood, the controller 64 senses the flow rate of the heated gas stream produced by the combustion of residue gas and air in the combustion chamber 32 flowing through the conduit 60 and controls the rate of residue gas and air flowing into the combustion chamber 32 accordingly.

A conduit 61 is provided connected to the conduit 60 and to a source of oxygen for combining oxygen with the heated gas stream flowing into the shaft furnace 12 by way of the conduit 60. A conduit 63 is provided also connected to a source of oxygen and to a header 65. The header 65 is connected to a plurality of oxygen inlets located in the bottom of the hearth 14 of the furnace 12 whereby oxygen can be blown through the pool of molten iron (not shown) which accumulates therein during operation of the furnace 12.

OPERATION OF THE APPARATUS 10

In operation of the apparatus 10 for carrying out the method of the present invention, the shaft furnace 12 is charged with iron ore, coke and limestone in a conventional manner. A stream of preheated oxygen enriched gas at a temperature preferably in the range of from about 1150°F to 1250°F is introduced into the tuyere section 16 of the furnace 12 by way of the conduit 60. Upon entering the shaft furnace 12 the heated oxygen enriched gas stream functions in the same manner as preheated air in a conventional blast furnace, i.e., the oxygen reacts with coke in the furnace to produce high temperature combustion and the resulting ascending gases which include carbon monoxide react with the descending iron ore reducing it to molten iron. Carbon in the shaft also reacts to reduce the iron ore and a pool of molten iron is accumulated in the hearth 14, portions of which are withdrawn therefrom by way of a tap 15 connected thereto.

The gangue material of the ore and the ash of the coke are fluxed by calcined limestone in the furnace to form molten slag which also accumulates in the hearth 14 and is periodically withdrawn by means of a tap 17 connected thereto. The reducing gas stream formed within the bosh section 18 of the furnace 12 flows upwardly through the shaft portion 20, and residue gases comprised principally of water vapor, carbon dioxide, nitrogen, hydrogen and carbon monoxide are withdrawn from the furnace 12 by way of the conduit 22. Solids are removed from the residue gas stream by the separator 24 and the resulting clean gas stream flows by way of conduit 22 to a point of further use or processing.

A portion of the residue gas stream passing through the conduit 23 flows through the conduit 26 to the suction of the blower 28. From the discharge of the blower 28 the residue gas flows through the conduit 30 and the control valve 62 into the combustion chamber 32 by way of the inlet connection 38 attached thereto. A stream of air produced by the blower 56 flows through the conduit 58 and the flow control valve 68 into the air inlet connection 54 of the combustion chamber 32.

Referring particularly to FIGS. 2 and 3, the stream of air produced by the blower 56 enters the annular area in the combustion chamber 32 between the outer shell 34, inner shell 46 and baffle 52 tangentially and follows a helical path downwardly therein to the lower end 48 of the inner shell 34. At this point the stream of air intimately mixes with the residue gas entering the chamber 32 by way of the connection 38 and the mixture passes into the internal hollow portion of the inner shell 46, wherein it is ignited and combusted, said combustion being the sole source of heat for heating the gas stream introduced into the shaft furnace 12. As a result of the combustion process within the inner shell 46, carbon monoxide contained in the residue gas is oxidized to carbon dioxide and a heated gas stream comprised of carbon dioxide, water vapor, oxygen and nitrogen is produced which exits the chamber 32 by way of the outlet connection 44 thereof. As will be understood, the flow ratio controller 64 is set to control the rate of residue gas flowing into the burner 32 by way of the flow control valve 62 at a level such that a desired volume of heated combustion gases are produced in the combustion chamber 32 which flow through the conduit 60 into the shaft furnace 12. In addition, the flow controller 64 controls the rate of air flowing into the chamber 32 by way of the flow control valve 68 at a predetermined ratio to the rate of residue gas being combusted in the chamber 32. The rate of air mixed with the residue gas can be controlled so that a substantially stoichiometric carbon monoxide-oxygen mixture results and complete combustion of the carbon monoxide takes place within the combustion chamber. Preferably however, the combustion chamber 32 is operated with excess air to produce oxygen enriching of the heated gas stream formed.

A stream of oxygen is continuously caused to flow from a source thereof (not shown) by way of the conduit 61 into the conduit 60 wherein it combines with the heated gas stream produced in the combustion chamber 32 and passing therethrough prior to when the stream enters the furnace 12. The enriching of the heated gas stream with oxygen is necessary in order to provide the requisite oxygen to support combustion of the coke in the furnace 12 and reach the required operating temperatures.

If it is desired to convert the molten iron produced in the furnace 12 to molten steel prior to withdrawing it from the furnace 12, the oxygen can be combined by way of the conduit 63 so that it is blown through the molten iron accumulated in the hearth 14 of the furnace 12. That is, instead of combining oxygen with the heated gas stream flowing into the furnace 12 by way of the conduit 60, the oxygen can be combined internally in the bosh section 18 of the furnace 12 after blowing through the pool of molten iron in the hearth 14 thereby converting the molten iron to molten steel.

In order to present a clear understanding of the method and process of the present invention the following example is given. As will be understood, the quantities of materials and other process conditions may vary depending upon the particular quality and kind of materials charged to the shaft furnace, and the present invention is not to be limited to those given in the example.

EXAMPLE

Referring to the drawings, and particularly to FIG. 1, 1844 tons/day of iron ore, 234 tons/day of limestone and 653 tons/day of coke are charged to the shaft furnace 12. A residue gas stream at a temperature of 350°F is withdrawn from the top of the shaft 20 of the furnace 12 at a rate of 3827 mmscf/hr.

A 455 mmscf/hr portion of the residue gas stream flows by way of the conduit 26 into the blower 28. The blower 28 compresses the residue gas to a pressure of 20 psig and causes it to flow by way of the conduit 30 into the combustion chamber 32. The residue gas has the following analysis:

| Component | Mole Percent |
|---|---|
| Water Vapor | 3.46 |
| Carbon Dioxide | 18.14 |
| Nitrogen | 44.79 |
| Hydrogen | 1.54 |
| Carbon Monoxide | 32.07 |
| Total | 100.00 |

The blower 56 produces a 1963 mmscf/hr stream of air at a temperature of 220°F which flows into the combustion chamber 32 by way of the connection 54 thereof and mixes with the residue gas entering the combustion chamber by way of the connection 38 thereof. The residue gas-air mixture is combusted within the combustion chamber 32 and heated to a temperature of 1200°F. The resulting heated gas stream which discharges into the conduit 60 has the following analysis:

| Component | Mole Percent |
|---|---|
| Water Vapor | 3.07 |
| Carbon Dioxide | 9.75 |
| Nitrogen | 73.26 |
| Excess Oxygen | 13.92 |
| Total | 100.00 |

A 177.5 mmscf/hr stream of pure oxygen is flowed by way of the conduit 61 into the conduit 60 and combines with the heated gas stream passing therethrough.

The temperature of the fully reduced metal in the bosh section 18 of the furnace 12 is 1850°F and the temperature of the molten pool of iron accumulated in the hearth 14 is 2750°F. The temperature of the hot reducing gases at the bosh section 18 is 1950°F. 1200 tons/day of molten iron are withdrawn from the hearth 14 by way of the tap 15.

The present invention, therefore, is well adapted to carry out the objects and attain the ends and advantages mentioned as well as those inherent therein. While presently preferred embodiments of the invention are given for the purpose of disclosure, numerous changes in the details of the process and arrangement of steps can be made which will readily suggest themselves to those skilled in the art and which are encompassed within the spirit of this invention and the scope of the appended claims.

What is claimed is:
1. A method of producing molten iron from iron ore which comprises the steps of:
   a. charging said iron ore along with coke and limestone to a shaft furnace;
   b. introducing a heated oxygen enriched gas stream into said shaft furnace so that coke contained therein is combusted, said iron ore is reduced to molten iron and a residue gas stream containing carbon monoxide is produced;
   c. withdrawing said residue gas stream from said shaft furnace;

d. combining at least a portion of said residue gas stream with a stream of air;
e. combusting said residue gas-air mixture so that carbon monoxide contained therein is converted to carbon dioxide and a heated gas stream is produced, the sole source of heat for heating said gas stream being said combustion of said residue gas;
f. combining a stream of oxygen with said heated gas stream to form a heated oxygen enriched gas stream; and
g. introducing said heated oxygen enriched gas stream into said shaft furnace in accordance with step (b) above.

2. The method of claim 1 wherein the heated oxygen enriched gas stream formed in accordance with step (f) has a temperature in the range of from about 1150° to about 1250°F.

3. The method of claim 2 wherein the rate of residue gas combined with air in accordance with step (d) is controlled so that the heated gas stream produced in accordance with step (e) is produced at a desired rate.

4. The method of claim 3 wherein the stream of air combined with said residue gas in accordance with step (d) is controlled at a rate such that a carbon monoxide-oxygen mixture containing excess oxygen results.

5. The method of claim 1 which is further characterized to include the step of accumulating the molten iron formed in accordance with step (b) in a pool at a bottom portion of said shaft furnace.

6. The method of claim 5 wherein the oxygen to be combined with said heated gas stream in accordance with step (f) is first blown through said pool of molten iron accumulated at a bottom portion of said shaft furnace thereby converting said molten iron into molten steel.

7. In a process for producing molten iron from iron ore wherein said iron ore is charged to a blast furnace along with coke and limestone and the mixture is reacted with a reducing gas stream so that said iron ore is reduced to pig iron and a blast furnace residue gas stream containing carbon monoxide is produced, said pig iron being accumulated in a pool at a bottom portion of said blast furnace, the improvement comprising:
a. oxidizing the carbon monoxide contained in at least a portion of said blast furnace residue gas stream so that a heated gas stream comprising water vapor, nitrogen, oxygen and carbon dioxide is produced, of heat for heating said gas stream being said oxidation of said residue gas;
b. combining a stream of oxygen with said heated gas stream to form a heated oxygen enriched gas stream; and
c. introducing said heated oxygen enriched gas stream into said blast furnace so that it forms said reducing gas stream by reacting with said coke.

8. The method of claim 7 wherein the heated oxygen enriched gas stream of step (b) is produced at a temperature in the range of from about 1150° to about 1250°F.

9. The method of claim 8 wherein the oxygen combined with said heated gas stream in accordance with step (b) is first blown through said pool of molten iron accumulated at the bottom portion of said blast furnace thereby converting said molten iron into molten steel.

* * * * *